US008748081B2

(12) United States Patent
Lee et al.

(10) Patent No.: US 8,748,081 B2
(45) Date of Patent: Jun. 10, 2014

(54) ORGANIC ANTI REFLECTIVE LAYER COMPOSITION

(71) Applicant: Korea Kumho Petrochemical Co., Ltd., Seoul (KR)

(72) Inventors: Jin Han Lee, Asan-si (KR); Shin Hyo Bae, Asan-si (KR); Seung Hee Hong, Asan-si (KR); Eun Hee Han, Asan-si (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 13/652,097

(22) Filed: Oct. 15, 2012

(65) Prior Publication Data

US 2013/0171565 A1 Jul. 4, 2013

(30) Foreign Application Priority Data

Dec. 29, 2011 (KR) ........................ 10-2011-0146127

(51) Int. Cl.
*G03F 7/11* (2006.01)
(52) U.S. Cl.
USPC ........ 430/271.1; 525/281; 525/289; 525/303; 525/304; 525/305; 524/905
(58) Field of Classification Search
None
See application file for complete search history.

(56) References Cited

U.S. PATENT DOCUMENTS

| | | | |
|---|---|---|---|
| 4,139,385 A * | 2/1979 | Crivello | 427/518 |
| 5,236,967 A * | 8/1993 | Ohkawa et al. | 522/32 |
| 6,872,333 B2 * | 3/2005 | Ishii et al. | 264/1.1 |
| 2008/0038678 A1 * | 2/2008 | Kishioka et al. | 430/327 |
| 2008/0107997 A1 * | 5/2008 | Hiroi et al. | 430/311 |
| 2012/0184640 A1 * | 7/2012 | Kim et al. | 522/150 |
| 2012/0296059 A1 * | 11/2012 | Lee et al. | 526/245 |

FOREIGN PATENT DOCUMENTS

| | | | |
|---|---|---|---|
| JP | 2008-201864 A | | 9/2008 |
| JP | 2009-86563 A | | 4/2009 |
| JP | 2009-229598 A | | 10/2009 |
| JP | 2011-032360 A | | 2/2011 |
| WO | WO-2011/099778 A2 * | | 8/2011 |

OTHER PUBLICATIONS

Andrzejewska et al "Photoinduced Crosslinking Polymerization in the PResence of Aromatic Thiols", Macromolecules, 2004, vol. 37, pp. 6346-6354 published on Web Jul. 22, 2004.*

Carlborg et al, Lab Chip, 2011, vol. 11, pp. 3136-3147 published Aug. 1, 2011.*

"Vinylic groups", IUPAC Conpendium of Chemical Terminology, $2^{nd}$ ed. (the "Gold Book"). Scientific Publications, Oxford (1997) XML on-line corrected version :http:/Kosata; updates compolied by A. Jenkins.*

"Vinyl compound", Hawley's Condensed Chemical Dictionary, 14 th Edition, Copyright 2002 by John Wiley & Sons, Inc, obtained http://www.knovel.com. one page.*

CAS Registry No. 105-37-3, "propanoic acid, ethyl ester" obtained from SciFInder database on Sep. 12, 2013 copyright American CHemical Society, two pages.*

Accession No. 2009:1526083, CAN 152:97214, CAPLUS, English Abstract of CN 101591232 a published Dec. 2009 with registry No. 42287-90-1P listed as Substance in the record, obtained from SciFinder database, American Chemical Society copyright 3 pages obtained Sep. 12, 2013.*

CAS Registry No. 42287-90-1 "Benzenepropanoic acid, 3-bromo-" obtained from SciFInder database on Oct. 4, 2013 copyright American CHemical Society, two pages.*

English translation of JP 2011-032360, A (2011) from machine translation from AIPN Japan Patent Office National Center for Industrial Property Information and Training, generated Apr. 15, 2014, 22 pages.*

English translation of JP 2009-086563, A (2009) from machine translation from AIPN Japan Patent Office National Center for Industrial Property Information and Training, generated Apr. 15, 2014, 18 pages.*

English translation of JP 2009-229598, A (2009) from machine translation from AIPN Japan Patent Office National Center for Industrial Property Information and Training, generated Apr. 15, 2014, 18 pages.*

English translation of JP, 2008-201864, A (2008) from machine translation from AIPN Japan Patent Office National Center for Industrial Property Information and Training, generated Apr. 15, 2014, 33 pages.*

* cited by examiner

*Primary Examiner* — Cynthia Hamilton
(74) *Attorney, Agent, or Firm* — Birch, Stewart, Kolasch & Birch, LLP

(57) ABSTRACT

Disclosed is an organic antireflective film composition which includes a monomer containing two or more thiol groups and a monomer containing two or more vinyl groups, as crosslinking agents. When the organic antireflective film composition is used, an antireflective film formed from the composition can be rapidly etched in an ultrafine pattern forming process, and the curing rate can be increased, while the etching rate is increased, without using an acid generator and a curing agent or by using the agents only in small amounts.

9 Claims, No Drawings

ORGANIC ANTI REFLECTIVE LAYER COMPOSITION

BACKGROUND OF THE INVENTION

1. Field of the Invention

The present invention relates to an organic antireflective film composition which prevents the reflection at an underlying layer in a lithographic process, prevents stationary waves, and has a fast dry etching rate, and more particularly, the present invention relates to an organic antireflective film composition which can be used in the production of an organic antireflective film useful for semiconductor ultrafine patterning.

2. Description of the Related Art

Along with recent high integration of semiconductor elements, there is a demand for ultrafine patterns having a line width of 0.10 micrometers or less for the production of ultra-large scale integrated circuits (LSI) and the like. Accordingly, the wavelength of the light used in the exposure process has also been further shortened as compared to the region of g-line or i-line that has been conventionally used, and more attention is being paid to studies on lithography using far-infrared radiation, KrF excimer laser light, and ArF excimer laser light.

Since the size of the patterns of semiconductor elements is becoming smaller and smaller, a uniform pattern can be obtained only if the reflection ratio is maintained to be less than 1% at maximum while an exposure process is underway, and thereby an adequate process margin can be obtained, so that a desired yield can be achieved.

Therefore, in order to reduce the reflection ratio as far as possible, more emphasis is given to a technology of disposing an organic antireflective film containing organic molecules which are capable of absorbing light, below a photoresist, and thereby regulating the reflection ratio, while preventing reflection at an underlying layer and eliminating stationary waves.

Thus, the organic antireflective film composition should be able to satisfy the following requirements.

Firstly, in order to prevent reflection at an underlying layer, the composition should contain a substance which is capable of absorbing the light in the wavelength region of the exposure light source.

Secondly, during a process of laminating a photoresist after an antireflective film is laminated, the antireflective film should not be dissolved and destroyed by the solvent of the photoresist. To this end, the antireflective film should be designed to have a structure which can be cured by heat, and in a process of laminating the antireflective film, a post-coating baking process is carried out so as to achieve curing.

Thirdly, the antireflective film should be etchable faster than the photoresist in the upper part, so as to reduce the loss of the photoresist for the etching of an underlying layer.

Fourthly, the antireflective film composition should not be reactive to the photoresist in the upper part. Furthermore, compounds such as an amine and an acid should not migrate to the photoresist layer. This is because the shape of the photoresist pattern, particularly footing or undercut can be caused.

Fifthly, the antireflective film composition should have optical properties that are suitable for various exposure processes involving various substrates, that is, an appropriate refractive index and an appropriate extinction coefficient, and should have good adhesive force against substrates and photoresists.

However, under current circumstances, an antireflective film that will be satisfactory in an ultrafine pattern forming process using ArF light has not been developed.

Therefore, development of an organic antireflective substance which has high absorption against specific wavelengths, particularly in order to prevent stationary waves that occur at the time of exposure to light having a wavelength of 193 nm and reflection, and to eliminate the back surface diffraction from an underlying layer and the influence of reflected light, is currently emerging as an urgent issue.

SUMMARY OF THE INVENTION

The present invention was achieved to address problems such as described above, and it is an object of the invention to provide an organic antireflective film composition which can absorb reflected light that occurs at the time of exposure during a lithographic process where fine pattern formation is required, and particularly in a lithographic process for forming ultrafine patterns by using a 193-nm ArF excimer laser.

In order to achieve the object described above, according to an aspect of the present invention, there is provided an organic antireflective film composition which includes a monomer containing two or more thiol groups and a monomer containing two or more vinyl groups as crosslinking agents.

According to an embodiment of the present invention, the monomer containing two or more thiol groups may be any one selected from the group consisting of compounds represented by the following formula (1) to formula (4):

[Chemical Formula 1]

(1)

wherein in the formula (1), $R_1$ and $R_2$ each independently represent an alkylene group having 1 to 30 carbon atoms, a cycloalkylene group having 3 to 30 carbon atoms, an arylene group having 6 to 30 carbon atoms, or a heteroarylene group having 2 to 30 carbon atoms;

[Chemical Formula 2]

(2)

wherein in the formula (2), $R_3$ represents an alkylene group having 1 to 30 carbon atoms, a cycloalkylene group having 3 to 30 carbon atoms, an arylene group having 6 to 30 carbon atoms, or a heteroarylene group having 2 to 30 carbon atoms;

[Chemical Formula 3]

(3)

wherein in the formula (3), $R_4$, $R_5$, $R_6$ and $R_7$ each independently represent any one selected from the group consisting of

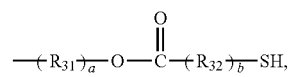

a hydrogen atom, and an alkyl group having 1 or 10 carbon atoms; two or more of $R_4$, $R_5$, $R_6$ and $R_7$ represent

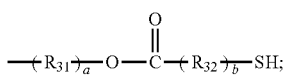

$R_{31}$ and $R_{32}$ each independently represent an alkylene group having 1 to 30 carbon atoms; and a and b each independently represent an integer of 0 or 1; and

[Chemical Formula 4]

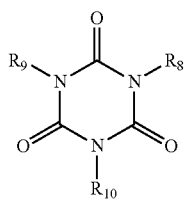 (4)

wherein in the formula (4), $R_8$, $R_9$ and $R_{10}$ each independently represent any one selected from the group consisting of

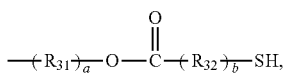

a hydrogen atom, and an alkyl group having 1 or 10 carbon atoms; two or more of $R_g$, $R_9$ and $R_{10}$ represent

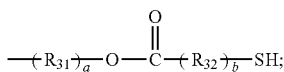

$R_{31}$ and $R_{32}$ each independently represent an alkylene group having 1 to 30 carbon atoms; and a and b each independently represent an integer of 0 or 1.

According to another embodiment of the present invention, the monomer containing two or more vinyl groups may be any one selected from the group consisting of compounds represented by the following formula (5) to formula (7):

[Chemical Formula 5]

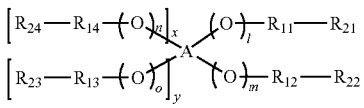 (5)

wherein in the formula (5), A represents any one selected from the group consisting of a cycloalkylene group having 3 to 30 carbon atoms, a heterocycloalkylene group having 2 to 30 carbon atoms, an arylene group having 6 to 30 carbon atoms, and a heteroarylene group having 2 to 30 carbon atoms; $R_{11}$, $R_{12}$, $R_{13}$ and $R_{14}$ each independently represent an alkylene group having 1 to 30 carbon atoms; $R_{21}$, $R_{22}$, $R_{23}$ and $R_{24}$ each independently represent

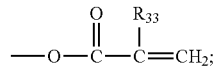

$R_{33}$ represents a hydrogen atom or an alkyl group having 1 to 10 carbon atoms; and l, m, n, o, x and y each independently represent an integer of 0 or 1;

[Chemical Formula 6]

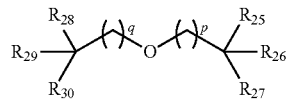 (6)

wherein in the formula (6), $R_{25}$ to $R_{30}$ each independently represent any one selected from the group consisting of

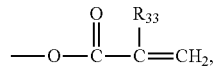

a hydrogen atom, and an alkyl group having 1 to 10 carbon atoms; two or more of $R_{25}$ to $R_{30}$ represent

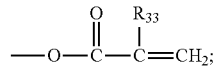

$R_{33}$ represents a hydrogen atom or an alkyl group having 1 to 10 carbon atoms; and p and q each independently represent an integer from 1 to 10; and

[Chemical Formula 7]

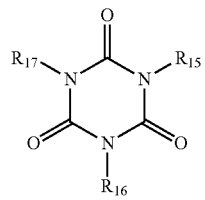 (7)

wherein in the formula (7), $R_{15}$, $R_{16}$ and $R_{17}$ each independently represent any one selected from the group consisting of

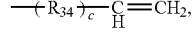

a hydrogen atom, and an alkyl group having 1 to 10 carbon atoms; two or more of $R_{15}$, $R_{16}$ and $R_{17}$ represent

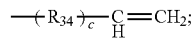

$R_{34}$ represents a hydrogen atom or an alkylene group having 1 to 10 carbon atoms; and c represents an integer of 0 or 1.

The monomer containing two or more thiol groups may be any one selected from the group consisting of compounds represented by the following formula (8) to formula (14):

[Chemical Formula 8]

$$HS\text{-}CH_2CH_2\text{-}S\text{-}CH_2CH_2\text{-}SH \quad (8)$$

[Chemical Formula 9]

(9)

[structure: pentaerythritol tetrakis(3-mercaptopropionate)]

[Chemical Formula 10]

(10)

[structure: 2,5-dimercapto-1,3,4-thiadiazole]

[Chemical Formula 11]

$$HSCH_2CH_2SH \quad (11)$$

[Chemical Formula 12]

(12)

[structure: 4,4'-thiobisbenzenethiol]

[Chemical Formula 13]

(13)

[structure: trimethylolpropane-type trithiol]

[Chemical Formula 14]

(14)

[structure: tris[2-(3-mercaptopropionyloxy)ethyl] isocyanurate]

The monomer containing two or more vinyl groups may be any one selected from the group consisting of compounds represented by the following formula (15) to formula (19):

[Chemical Formula 15]

(15)

[structure: dicyclopentadienyl diacrylate]

[Chemical Formula 16]

(16)

[structure: dipentaerythritol hexaacrylate]

[Chemical Formula 17]

(17)

[structure: 9,9-bis[4-(2-acryloyloxyethoxy)phenyl]fluorene]

[Chemical Formula 18]

(18)

[structure: pentaerythritol triacrylate ethoxylate]

[Chemical Formula 19]

(19)

[structure: triallyl isocyanurate]

The organic antireflective film composition according to an embodiment of the present invention may contain the first monomer and the second monomer at a weight ratio of 1:99 to 99:1.

The organic antireflective film composition may contain the first monomer at a proportion of 0.01% to 40% by weight, and the second monomer at a proportion of 0.01% to 40% by weight, relative to the total amount of the organic antireflective film composition.

According to still another embodiment of the present invention, the organic antireflective film composition may further contain a light absorbing agent, a polymer, an acid generator, a curing agent, and a solvent.

The organic antireflective film composition may contain the light absorbing agent at a proportion of 0.01% to 30% by weight, the polymer at a proportion of 0.01% to 40% by weight, the acid generator at a proportion of 0.01% to 10% by weight, and the curing agent at a proportion of 0.01% to 30% by weight, all relative to the total amount of the organic antireflective film composition.

DETAILED DESCRIPTION OF THE PREFERRED EMBODIMENTS

Hereinafter, the present invention will be described in more detail.

$R_1$ to $R_{17}$ and $R_{21}$ to $R_{34}$ according to the present invention may be substituted.

The term "substituted" according to the present invention means that at least one hydrogen atoms may be substituted by a halogen atom, a hydroxyl group, a nitro group, a cyano group, an amino group, an amidino group, a hydrazine group, a hydrazone group, a carboxyl group or a salt thereof, a sulfonic acid group or a salt thereof, a phosphoric acid group or a salt thereof, an alkyl group having 1 to 10 carbon atoms, an alkenyl group having 1 to 10 carbon atoms, an alkynyl group having 1 to 10 carbon atoms, an aryl group having 6 to 10 carbon atoms, an arylalkyl group having 7 to 20 carbon atoms, a heteroaryl group having 4 to 20 carbon atoms, or a heteroarylalkyl group having 5 to 20 carbon atoms.

The "resin" according to the present invention may be any one of a random copolymer, a block copolymer and a graft copolymer. A resin that is used to form the organic antireflective film of the present invention can be synthesized by methods such as radical polymerization, anionic polymerization, and cationic polymerization. The synthesis can be carried out by any conventional form such as suspension polymerization, solution polymerization, emulsion polymerization, or bulk polymerization.

The organic antireflective film composition according to an embodiment of the present invention includes a monomer containing two or more thiol groups and a monomer containing two or more vinyl groups, as crosslinking agents. These monomers may be present in the form of a resin containing derivative of the monomers or structural units derived from the monomers or derivatives thereof. It is preferable that the monomers respectively two to six thiol groups or vinyl groups.

The monomer containing two or more thiol groups may be any one selected from the group consisting of compounds represented by the following formula (1) to formula (4):

[Chemical Formula 1]

$$HS-R_1-S-R_2-SH \tag{1}$$

wherein in the formula (1), $R_1$ and $R_2$ each independently represent any one selected from the group consisting of an alkylene group having 1 to 30 carbon atoms, a cycloalkylene group having 3 to 30 carbon atoms, an arylene group having 6 to 30 carbon atoms, and a heteroarylene group having 2 to 30 carbon atoms;

[Chemical Formula 2]

$$HS-R_3-SH \tag{2}$$

wherein in the formula (2), $R_3$ represents any one selected from the group consisting of an alkylene group having 1 to 30 carbon atoms, a cycloalkylene group having 3 to 30 carbon atoms, an arylene group having 6 to 30 carbon atoms, and a heteroarylene group having 2 to 30 carbon atoms;

[Chemical Formula 3]

(3)

wherein in the formula (3), $R_4$, $R_5$, $R_6$ and $R_7$ each independently represent any one selected from the group consisting of

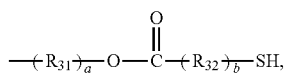

a hydrogen atom, and an alkyl group having 1 or 10 carbon atoms; two or more of $R_4$, $R_5$, $R_6$ and $R_7$ represent

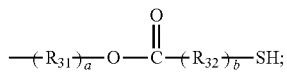

$R_{31}$ and $R_{32}$ each independently represent an alkylene group having 1 to 30 carbon atoms; and a and b each independently represent an integer of 0 or 1; and

[Chemical Formula 4]

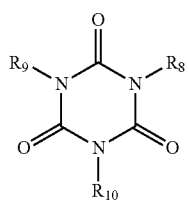

(4)

wherein in the formula (4), $R_8$, $R_9$ and $R_{10}$ each independently represent any one selected from the group consisting of

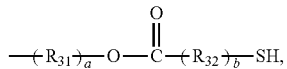

a hydrogen atom, and an alkyl group having 1 or 10 carbon atoms; two or more of $R_8$, $R_9$ and $R_{10}$ represent

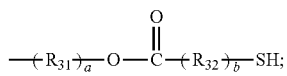

$R_{31}$ and $R_{32}$ each independently represent an alkylene group having 1 to 30 carbon atoms; and a and b each independently represent an integer of 0 or 1.

Specific examples of the compounds represented by the formula (1) to formula (4) according to the present invention include compounds represented by the following formula (8) to formula (14):

[Chemical Formula 8]

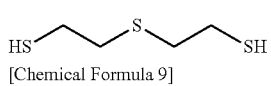
(8)

[Chemical Formula 9]

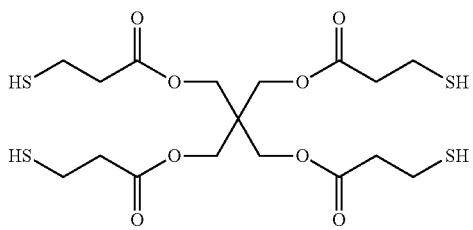
(9)

[Chemical Formula 10]

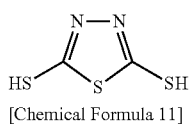
(10)

[Chemical Formula 11]

HSCH$_2$CH$_2$SH (11)

[Chemical Formula 12]

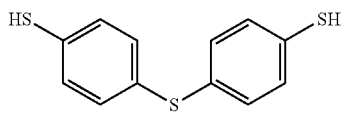
(12)

[Chemical Formula 13]

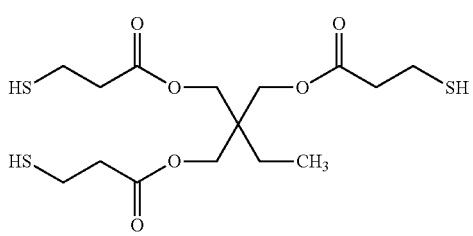
(13)

[Chemical Formula 14]

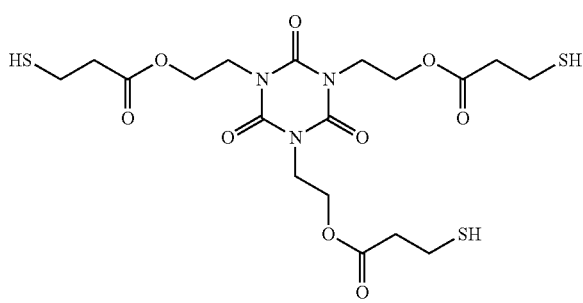
(14)

When the composition includes the monomer containing two or more thiol groups described above, the etching rate is improved to be faster, and curing can be achieved satisfactorily even if a conventionally used curing agent or a conventionally used acid generator for accelerating curing is absent or used in a small amount.

The monomer containing two or more vinyl groups may be any one selected from the group consisting of compounds represented by the following formula (5) to formula (7):

[Chemical Formula 5]

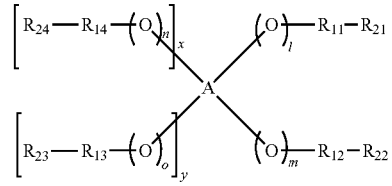
(5)

wherein in the formula (5), A represents any one selected from the group consisting of a cycloalkylene group having 3 to 30 carbon atoms, a heterocycloalkylene group having 2 to 30 carbon atoms, an arylene group having 6 to 30 carbon atoms, and a heteroarylene group having 2 to 30 carbon atoms; $R_{11}$, $R_{12}$, $R_{13}$ and $R_{14}$ each independently represent an alkylene group having 1 to 30 carbon atoms; $R_{21}$, $R_{22}$, $R_{23}$ and $R_{24}$ each independently represent

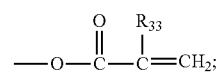

$R_{33}$ represents a hydrogen atom or an alkyl group having 1 to 10 carbon atoms; and l, m, n, o, x and y each independently represent an integer of 0 or 1;

[Chemical Formula 6]

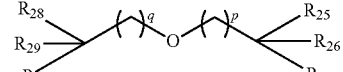
(6)

wherein in the formula (6), $R_{25}$ to $R_{30}$ each independently represent any one selected from the group consisting of

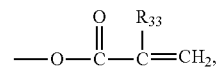

a hydrogen atom, and an alkyl group having 1 to 10 carbon atoms; two or more of $R_{25}$ to $R_{30}$ represent

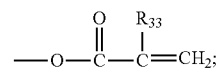

$R_{33}$ represents a hydrogen atom or an alkyl group having 1 to 10 carbon atoms; and p and q each independently represent an integer from 1 to 10; and

[Chemical Formula 7]

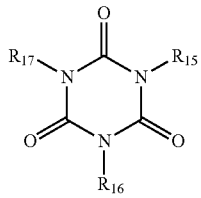
(7)

wherein in the formula (7), $R_{15}$, $R_{16}$ and $R_{17}$ each independently represent any one selected from the group consisting of

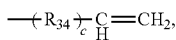

a hydrogen atom, and an alkyl group having 1 to 10 carbon atoms; two or more of $R_{15}$, $R_{16}$ and $R_{17}$ represent

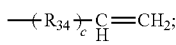

$R_{34}$ represents a hydrogen atom or an alkyl group having 1 to 10 carbon atoms; and c represents an integer of 0 or 1.

Specific examples of the compounds represented by the formula (5) to formula (7) according to the present invention include compounds represented by the following formula (15) to formula (19):

[Chemical Formula 15]

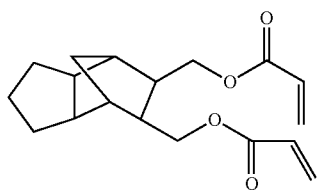
(15)

[Chemical Formula 16]

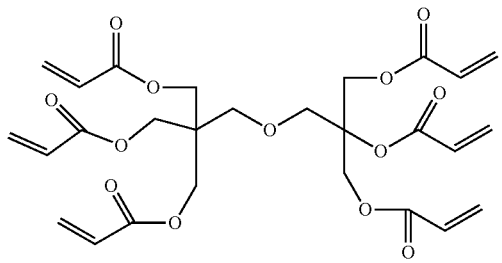
(16)

[Chemical Formula 17]

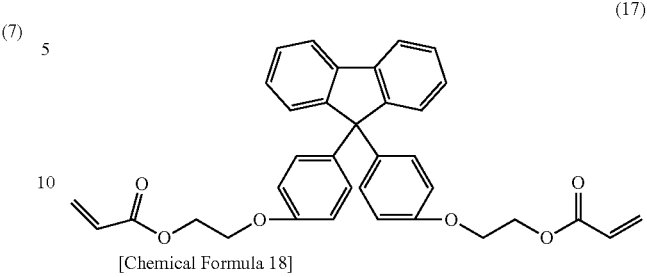
(17)

[Chemical Formula 18]

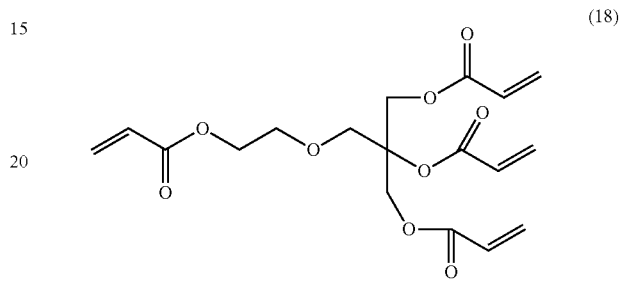
(18)

[Chemical Formula 19]

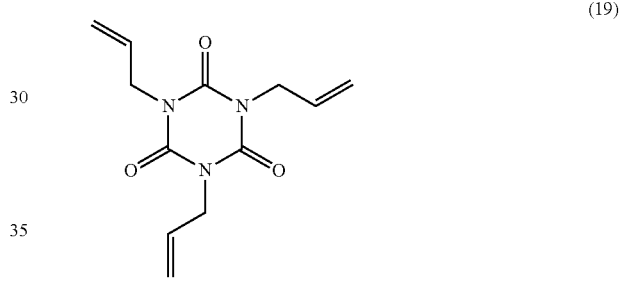
(19)

When the organic antireflective film composition includes the monomer containing two or more vinyl groups described above, the vinyl groups and the thiol groups effect to increase the etching rate, and thereby, curing can be achieved satisfactorily even if a curing agent or an acid generator for accelerating curing, which is conventionally used, is not used or used in a small amount.

The crosslinking agents are compounds having crosslinking-forming functional groups, and are capable of enhancing the curing rate of the light absorbing agent and the polymer, and the performance.

In a semiconductor process, when an organic antireflective film which contains a monomer containing two or more thiol groups and a monomer containing two or more vinyl groups is applied on a wafer, and then the wafer is heated, the two monomers react with each other and form an antireflective coating. This antireflective coating absorbs the far-ultraviolet radiation that has penetrated the photoresist and reached the antireflective film, and can thereby prevent diffuse reflection from an underlying layer below the photoresist.

The organic antireflective film composition may include the monomer containing two or more thiol groups and the monomer containing two or more vinyl groups, at a weight ratio of 1:99 to 99:1, and preferably at a weight ratio of 1:39 to 39:1. When the composition includes the crosslinking agents at a weight ratio in the range described above, the etching rate may be improved, and the content of the acid generator can be reduced.

Furthermore, the content of the monomer containing two or more thiol groups may be 0.01% to 40% by weight, and preferably 0.01% to 5% by weight, relative to the total amount of the organic antireflective film composition, and the content of the monomer containing two or more vinyl groups may be 0.01% to 40% by weight, and preferably 0.01% to 5% by weight, relative to the total amount of the organic antireflective film composition. When the composition includes the crosslinking agents at a content in the range described above, the etching rate may be improved, and the content of the acid generator can be reduced.

Furthermore, the organic antireflective film composition may further include a polymer, a light absorbing agent, an acid generator, a curing agent, and a solvent, and a surfactant and various additives may be further added to the composition.

The polymer that is included in the organic antireflective film composition may contain a hydroxyl group, a glycidyl group, an acetal group and the like, and there are no particular limitations as long as the polymer is obtainable by polymerizing an acrylate-based monomer, a maleic anhydride-based monomer, a phenolic monomer, or an ester-based monomer, and contains crosslinking sites at the ends of the linear backbone or side chains. The polymer may be a polymer containing a region which functions as a light absorbing agent. In the case of a polymer containing such a region which functions as a light absorbing agent, the polymer can be usefully used in the organic antireflective film composition.

As the polymer to be used as a component, a polymer obtained by polymerizing an ester-based monomer can be preferably used, and more preferably, a polymer containing propionic acid ethyl ester and propionic acid chlorobenzyl ester as repeating units can be used. When the aforementioned polymer is used in an organic antireflective film, the refractive index is increased, and particularly, the antireflective film composition can achieve a balance between hydrophilicity and hydrophobicity while having a high refractive index. Thus, the resulting antireflective film is particularly useful as an antireflective film in a lithographic process for forming ultrafine patterns using a 193-nm ArF excimer laser. Also, when the copolymer described above is used, the polymer can absorb light while a crosslinked structure can be formed within one repeating unit. Thus, the reactivity with resist layers can be controlled in processes following the formation of an antireflective film, and the etching rate can be increased.

An organic antireflective film which uses the polymer described above is cured while undergoing a baking process after the antireflective film composition is coated on a substrate, and thus acquires resistance to dissolution in solvents. Accordingly, the phenomenon in which the organic antireflective film is dissolved in the solvent of a photosensitizer at the time of coating the photosensitizer after the lamination of the antireflective film, does not occur, and stability is imparted to the organic antireflective film. Thus, the polymer described above can be preferably used in the organic antireflective film composition.

The light absorbing agent that is included in the organic antireflective film composition is a chemical species capable of light absorption. Both in the case where the light absorbing agent exists separately from a polymer which is not capable of light absorption, and in the case where the light absorbing agent is contained in a polymer, the light absorbing agent can be used so as to adjust the total amount of light-absorbent chemical species.

The light absorbing agent may contain a chromophore having a large absorbance, which allows absorption of light at 193 nm, as well as functional groups for thermal curing. The light absorbing agent can be synthesized by a conventional method.

The acid generator that is included in the organic antireflective film composition can be used as a catalyst for accelerating the curing reaction. Examples of the acid generator that can be used in the present invention include toluenesulfonic acid, an amine salt or pyridine salt of toluenesulfonic acid, an alkylsulfonic acid, and an amine salt or pyridine salt of an alkylsulfonic acid.

The curing agent that is included in the organic antireflective film composition is intended to help curing of the polymer and the light absorbing agent, and improvement of the performance. Thus, the curing agent may contain two or more crosslinking functional groups per compound, and it is preferable that the crosslinking functional group be reactive with the functional groups of the polymer and the functional groups of the light absorbing agent.

Examples of the curing agent include aminoplastic compounds, polyfunctional epoxy resins, dianhydrides, and mixtures thereof, and examples of the aminoplastic compounds include, but are not limited to, dimethoxymethyl glycouril, diethoxymethyl glycouril, diethyldimethylmethyl glycouril, tetramethoxymethyl glycouril, and hexamethoxymethyl melamine resins, and mixtures thereof.

As the organic solvent that is included in the organic antireflective film composition, any one or more solvents selected from the group consisting of propylene glycol monomethyl ether (PGME), propylene glycol monomethyl ether acetate (PGMEA), cyclohexanone, ethyl lactate, propylene glycol n-propyl ether, dimethylformamide (DMF), γ-butyrolactone, ethoxyethanol, methoxyethanol, methyl 3-methoxypropionate (MMP) and ethyl 3-ethoxypropionate (EEP), can be used.

The organic antireflective film composition may contain a surfactant in order to prevent the occurrence of pinholes or striation, and to further improve coatability of the composition against surface irregularities.

The organic antireflective film composition may contain the light absorbing agent at a proportion of 0.01% to 30% by weight, the polymer at a proportion of 0.01% to 40% by weight, the acid generator at a proportion of 0.01% to 10% by weight, and the curing agent at a proportion of 0.01% to 30% by weight, and preferably contains the light absorbing agent at a proportion of 0.01% to 10% by weight, the polymer at a proportion of 0.01% to 10% by weight, the acid generator at a proportion of 0.01% to 5% by weight, and the curing agent at a proportion of 0.01% to 40% by weight. The organic solvent and other additional additives that are known and widely used may constitute the balance of the percentage content.

When an organic antireflective film composition containing the constituent components described above at the composition ratios described above is applied on a wafer, and then the wafer is subjected to a heating process such as baking, a chemical reaction occurs between the thiol groups and the vinyl groups, and an antireflective coating is formed. Such an organic antireflective film absorbs far-ultraviolet radiation that has penetrated the photoresist and reached the antireflective film, and can prevent diffuse reflection at an underlying layer below the photoresist.

The method of forming a pattern of a semiconductor element by using the organic antireflective film composition according to the present invention includes a step of applying the organic antireflective film composition on top of a layer to be etched; a step of forming an antireflective film by curing the applied composition through a baking process and thereby forming crosslinking; a step of forming a photoresist pattern by applying a photoresist on top of the organic antireflective film, and subjecting the photoresist to exposure followed by development; and a step of etching the organic antireflective film by using the photoresist pattern as an etching mask, and then etching the layer to be etched to form a pattern of the layer to be etched.

In the step of laminating an organic antireflective film, the baking process can be carried out preferably at a temperature of 150° C. to 250° C. for 0.5 to 5 minutes, and preferably 1 minute to 5 minutes.

In the pattern forming method, baking process can be additionally carried out once more either before or after an organic or inorganic composition for an antireflective film or a silicone antireflective film is laminated on top of a carbon hard mask, and such a baking process can be preferably carried out at a temperature of 70° C. to 200° C.

When a pattern is formed by using the organic antireflective film composition according to the present invention, the antireflective film can be rapidly etched in an ultrafine pattern forming process where a 193-nm light source is used, and the curing rate can be increased, while the etching rate can be increased, without using an acid generator and a curing agent or by using the agents only in small amounts.

EXAMPLES

The present invention will be specifically described by way of the following Preparation Examples and Examples. However, the present invention can be realized in various different forms, and is not intended to be limited to the Examples that are described herein.

Preparation Example

Production of Copolymer 50 g of 4-chlorobenzyl methacrylate and 30.88 g of 2-hydroxyethyl methacrylate were dissolved in 50 g of dioxane, and thus a solution 1-1 was prepared. 4.04 g of 2,2'-azobisisobutyronitrile was dissolved in 242 g of dioxane, and the solution was heated to 80° C., and thus a solution 1-2 was prepared. When the temperature of the solution 1-2 reached 75° C., the solution 1-1 was slowly added dropwise to the heated solution 1-2 for 1.5 hours, and the mixture was stirred for 4 hours to prepare a solution 1-3. Subsequently, the stirred solution 1-3 was cooled to normal temperature (25° C.), and deionized water was added to the solution 1-3 in an amount of 8 times the volume of the solution 1-3. A precipitate thus obtained was dried in a vacuum oven for 24 hours, and thus a copolymer was produced.

Preparation Example

Preparation of Organic Antireflective Film Composition

Example 1

15 g of the copolymer produced in the Preparation Example, 2 g of a compound represented by the formula (9), 2 g of a compound represented by the formula (16), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 2

15 g of the copolymer produced in the Preparation Example, 2 g of a compound represented by the formula (12), 2 g of a compound represented by the formula (17), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 3

15 g of the copolymer produced in the Preparation Example, 2 g of a compound represented by the formula (13), 2 g of a compound represented by the formula (18), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 4

15 g of the copolymer produced in the Preparation Example, 2 g of a compound represented by the formula (14), 2 g of a compound represented by the formula (19), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 5

15 g of the copolymer produced in the Preparation Example, 2 g of a compound represented by the formula (10), 2 g of a compound represented by the formula (19), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 6

15 g of the copolymer produced in the Preparation Example, 2 g of a compound represented by the formula (11), 2 g of a compound represented by the formula (15), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Example 7

15 g of the copolymer produced in the Preparation Example, 2 g of a compound represented by the formula (14), 2 g of a compound represented by the formula (17), and 5 g of a curing agent were dissolved in 930 g of propylene glycol monomethyl ether acetate, and then the solution was filtered through a membrane filter having a pore size of 0.2 µm. Thus, an organic antireflective film composition was prepared.

Comparative Example 1

15 g of the copolymer produced in the Preparation Example and 5 g of a curing agent were dissolved in 930 g of propylene glycol monomethyl ether acetate, and then the solution was filtered through a membrane filter having a pore size of 0.2 µm. Thus, an organic antireflective film composition was prepared.

[Evaluation of Properties of Organic Antireflective Films]

(Stripping Test)

Each of the organic antireflective film compositions prepared in Examples 1 to 7 was spin coated on a silicon wafer, and then the antireflective film composition was baked for one minute on a plate heated to 230° C. Thus, an organic antireflective film was formed, and the thickness was measured (Measurement 1).

The wafer coated with the organic antireflective film was immersed in ethyl lactate for one minute, and then ethyl lactate was completely removed. The antireflective film composition was baked for one minute on a plate heated to 100° C., and then the thickness of the organic antireflective film was measured again (Measurement 2).

When the results of Measurement 1 were compared with the results of Measurement 2, it was found that there was no change in the thickness of the films formed from the compositions of Examples 1 to 7 before and after the ethyl lactate treatment.

From the results described above, it was verified that the organic antireflective film compositions prepared in Comparative Example 1 and Examples 1 to 7 of the present invention were completely cured during the baking processes, and thus intermixing with the photoresist did not occur in the course of the lithographic process.

(Measurement of Refractive Index (n) and Extinction Coefficient (k) Values)

Each of the organic antireflective film compositions prepared in Examples 1 to 7 and Comparative Example 1 was spin coated on a silicon wafer, and then the composition was baked for one minute on a hot plate at 230° C. Thus, a crosslinked organic antireflective film was formed. The refractive index (n) and extinction coefficient (k) of each of the organic antireflective films were measured at 193 nm by using a spectroscopic ellipsometer (J.A. Woollam Co., Inc.). The results are presented in the following Table 1.

TABLE 1

|  | Refractive index (n) | Extinction coefficient (k) |
|---|---|---|
| Comparative Example 1 | 1.87 | 0.30 |
| Example 1 | 1.90 | 0.26 |
| Example 2 | 1.84 | 0.40 |
| Example 3 | 1.89 | 0.30 |
| Example 4 | 1.90 | 0.33 |
| Example 5 | 1.86 | 0.32 |
| Example 6 | 1.87 | 0.33 |
| Example 7 | 1.91 | 0.35 |

According to the results of Table 1, it was found that the organic antireflective films formed from the compositions of Examples 1 to 7 have refractive indices and extinction coefficients that are adequate to be applied to a lithographic process using a light source having a wavelength of 193 nm.

(Measurement of Etching Rate)

Each of the organic antireflective film compositions prepared in Examples 1 to 7 and Comparative Example 1 was spin coated on a silicon wafer, and then the antireflective film composition was baked for one minute on a plate heated to 230° C. Thus, an organic antireflective film was formed. A film thickness greater than 1000 Å was obtained by varying the spinning speed. Thereafter, the film was subjected to dry etching ($CF_4/O_2/Ar$) for 15 seconds. The thickness of the etched film was measured again, and the etching rate was calculated. The results are presented in the following Table 2.

TABLE 2

|  | Etching rate (Å/min) |
|---|---|
| Comparative Example 1 | 61.37 |
| Example 1 | 65.74 |
| Example 2 | 63.40 |
| Example 3 | 64.07 |
| Example 4 | 66.24 |
| Example 5 | 63.24 |
| Example 6 | 59.24 |
| Example 7 | 60.24 |

According to the results of Table 2, it was found that the organic antireflective films formed from the compositions of Examples 1 to 7 have higher dry etching rates than the organic antireflective film of Comparative Example 1.

What is claimed is:

1. An organic antireflective film composition comprising:
   a first monomer containing two or more thiol groups and a second monomer containing two or more vinyl groups, as crosslinking agents; and
   a polymer containing hydroxyethyl (meth)acrylate and chlorobenzyl (meth)acrylate as repeating units.

2. The organic antireflective film composition according to claim 1, wherein the first monomer is any one selected from the group consisting of compounds represented by the following formula (1) to formula (4):

[Chemical Formula 1]

$$HS-R_1-S-R_2-SH \quad (1)$$

wherein in the formula (1), $R_1$ and $R_2$ each independently represent an alkylene group having 1 to 30 carbon atoms, a cycloalkylene group having 3 to 30 carbon atoms, an arylene group having 6 to 30 carbon atoms, or a heteroarylene group having 2 to 30 carbon atoms;

[Chemical Formula 2]

$$HS-R_3-SH \quad (2)$$

wherein in the formula (2), $R_3$ represents an alkylene group having 1 to 30 carbon atoms, a cycloalkylene group having 3 to 30 carbon atoms, an arylene group having 6 to 30 carbon atoms, or a heteroarylene group having 2 to 30 carbon atoms;

[Chemical Formula 3]

(3)

wherein in the formula (3), $R_4$, $R_5$, $R_6$ and $R_7$ each independently represent any one selected from the group consisting of

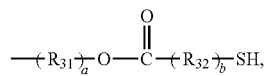

a hydrogen atom, and an alkyl group having 1 or 10 carbon atoms; two or more of $R_4$, $R_5$, $R_6$ and $R_7$ represent

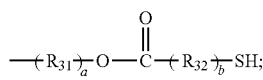

$R_{31}$ and $R_{32}$ each independently represent an alkylene group having 1 to 30 carbon atoms; and a and b each independently represent an integer of 0 or 1; and

[Chemical Formula 4]

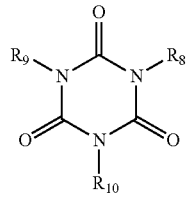

(4)

wherein in the formula (4), $R_8$, $R_9$ and $R_{10}$ each independently represent any one selected from the group consisting of

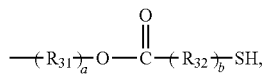

a hydrogen atom, and an alkyl group having 1 or 10 carbon atoms; two or more of $R_8$, $R_9$ and $R_{10}$ represent

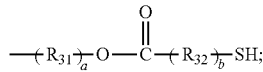

$R_{31}$ and $R_{32}$ each independently represent an alkylene group having 1 to 30 carbon atoms; and a and b each independently represent an integer of 0 or 1.

3. The organic antireflective film composition according to claim 1, wherein the second monomer is any one selected from the group consisting of compounds represented by the following formula (5) to formula (7):

[Chemical Formula 5]

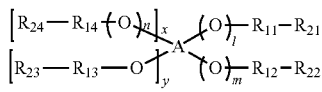

(5)

wherein in the formula (5), A represents any one selected from the group consisting of a cycloalkylene group having 3 to 30 carbon atoms, a heterocycloalkylene group having 2 to 30 carbon atoms, an arylene group having 6 to 30 carbon atoms, and a heteroarylene group having 2 to 30 carbon atoms; $R_{11}$, $R_{12}$, $R_{13}$ and $R_{14}$ each independently represent an alkylene group having 1 to 30 carbon atoms; $R_{21}$, $R_{22}$, $R_{23}$ and $R_{24}$ each independently represent

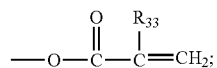

$R_{33}$ represents a hydrogen atom or an alkyl group having 1 to 10 carbon atoms; and 1, m, n, o, x and y each independently represent an integer of 0 or 1;

[Chemical Formula 6]

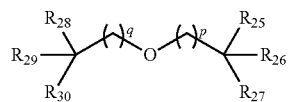

(6)

wherein in the formula (6), $R_{25}$ to $R_{30}$ each independently represent any one selected from the group consisting of

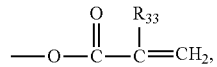

a hydrogen atom, and an alkyl group having 1 to 10 carbon atoms; two or more of $R_{25}$ to $R_{30}$ represent

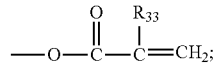

$R_{33}$ represents a hydrogen atom or an alkyl group having 1 to 10 carbon atoms; and p and q each independently represent an integer from 1 to 10; and

[Chemical Formula 7]

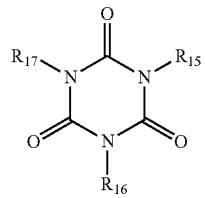

(7)

wherein in the formula (7), $R_{15}$, $R_{16}$ and $R_{17}$ each independently represent any one selected from the group consisting of

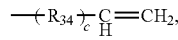

a hydrogen atom, and an alkyl group having 1 to 10 carbon atoms; two or more of $R_{15}$, $R_{16}$ and $R_{17}$ represent

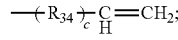

$R_{34}$ represents a hydrogen atom or an alkylene group having 1 to 10 carbon atoms; and c represents an integer of 0 or 1.

4. The organic antireflective film composition according to claim 1, wherein the first monomer is any one selected from the group consisting of compounds represented by the following formula (8) to formula (14):

[Chemical Formula 8]

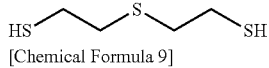
(8)

[Chemical Formula 9]

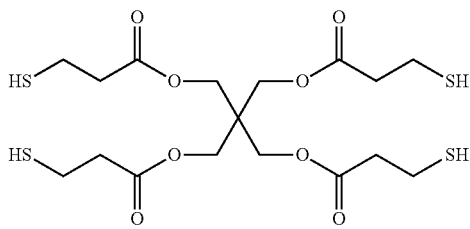
(9)

[Chemical Formula 10]

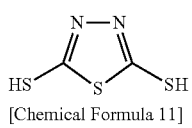
(10)

[Chemical Formula 11]

HSCH$_2$CH$_2$SH (11)

[Chemical Formula 12]

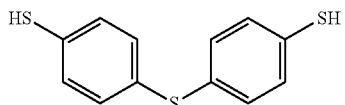
(12)

[Chemical Formula 13]

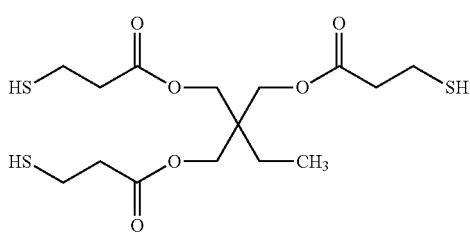
(13)

[Chemical Formula 14]

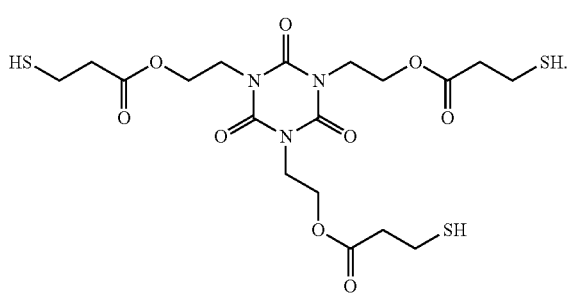
(14)

5. The organic antireflective film composition according to claim 1, wherein the second monomer is any one selected from the group consisting of compounds represented by the following formula (15) to formula (19):

[Chemical Formula 15]

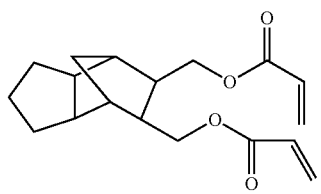
(15)

[Chemical Formula 16]

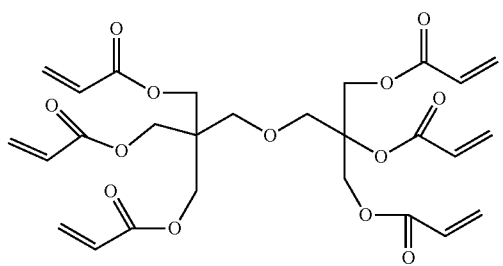
(16)

[Chemical Formula 17]

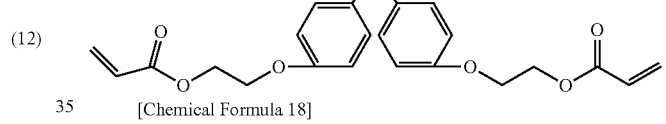
(17)

[Chemical Formula 18]

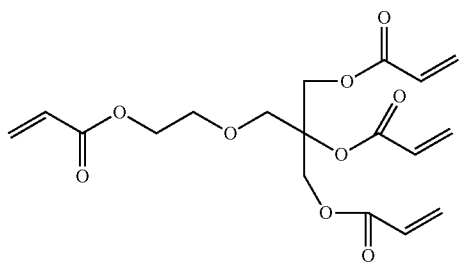
(18)

[Chemical Formula 19]

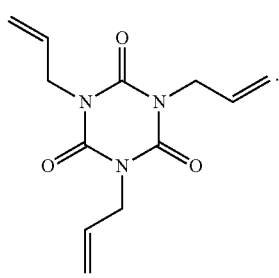
(19)

6. The organic antireflective film composition according to claim 1, wherein the organic antireflective film composition contains the first monomer and the second monomer at a weight ratio of 1:99 to 99:1.

7. The organic antireflective film composition according to claim 1, wherein the organic antireflective film composition contains the first monomer at a proportion of 0.01% to 40% by weight and the second monomer at a proportion of 0.01% to 40% by weight, relative to the total amount of the organic antireflective film composition.

8. The organic antireflective film composition according to claim 1, further comprising a light absorbing agent, an acid generator, a curing agent and an organic solvent.

9. The organic antireflective film composition according to claim 8, wherein the organic antireflective film composition contains the light absorbing agent at a proportion of 0.01% to 30% by weight, the acid generator at a proportion of 0.01% to 10% by weight, and the curing agent at a proportion of 0.01% to 30% by weight, all relative to the total amount of the organic antireflective film composition.

\* \* \* \* \*